(12) United States Patent
Spirito

(10) Patent No.: US 7,487,599 B1
(45) Date of Patent: Feb. 10, 2009

(54) ANGLE GAUGE AND METHOD OF USE

(76) Inventor: James E. Spirito, 109 Laurel Oak Dr., Longwood, FL (US) 32779

( * ) Notice: Subject to any disclaimer, the term of this patent is extended or adjusted under 35 U.S.C. 154(b) by 28 days.

(21) Appl. No.: 11/895,114

(22) Filed: Aug. 23, 2007

(51) Int. Cl.
*B23B 49/00* (2006.01)
*B23Q 17/22* (2006.01)

(52) U.S. Cl. .......................... 33/640; 33/534; 33/1 BB

(58) Field of Classification Search ................. 33/1 BB, 33/534, 535, 633, 638, 640, 641
See application file for complete search history.

(56) References Cited

U.S. PATENT DOCUMENTS

| | | | | |
|---|---|---|---|---|
| 2,435,514 A | * | 2/1948 | Ross | 340/678 |
| 2,969,597 A | * | 1/1961 | Croshier | 33/535 |
| 4,386,344 A | * | 5/1983 | Vecchiatto | 340/686.5 |
| 4,697,174 A | * | 9/1987 | Viator, Sr. | 340/689 |
| 5,031,335 A | * | 7/1991 | Kimmelman | 33/633 |
| 6,263,584 B1 | * | 7/2001 | Owens | 33/640 |
| 6,775,917 B1 | * | 8/2004 | Campbell | 33/640 |
| 2002/0023365 A1 | * | 2/2002 | Cole | 33/640 |

* cited by examiner

*Primary Examiner*—G. Bradley Bennett
(74) *Attorney, Agent, or Firm*—Paul S. Rooy PA

(57) ABSTRACT

An angle gauge and method of use. The angle gauge has a housing with a housing probe wall and a housing foot defining a gauge angle. A pair of probes extends from the housing probe wall. A light and a battery are electrically connected in series between the probes. A pre-determined angle between an object and a flat surface can be gauged by placing the angle gauge with its housing foot flat on the flat surface, and then sliding the angle gauge across the flat surface until at least one probe is in electrical contact with the object, and then adjusting the angle of the object relative to the flat surface until both probes are in contact with the object, thereby illuminating the light. A conductor may be attached to non-conducting objects. A method of calibration is disclosed using a calibrated angle.

26 Claims, 4 Drawing Sheets

ANGLE GAUGE AND METHOD OF USE

FIELD OF THE INVENTION

This invention relates to gauges, and in particular to an angle gauge and method of use.

BACKGROUND OF THE INVENTION

Many tools require calibration so their cutting media are perpendicular to a work surface supporting the work piece. For example, in order to cut squarely, a table saw blade must be perpendicular to the table. Similarly, a drill press is generally desired to have its drill bit perpendicular to the platform supporting the work piece below the drill. This is achieved by rendering the chuck perpendicular to the platform.

EXISTING DESIGNS

A number of approaches have been advanced to adjust the perpendicularity of tools. One procedure is to adjust the blade angle, visually test the angle with a right angle (top and bottom) between the blade and the table, and repeat the procedure until something close to a right angle is achieved, literally through trial and error. This process is time-consuming and inherently inaccurate, and requires one to squint through the crack between the tool and the right angle to see of any daylight is visible—if so, the tool isn't perpendicular.

Another approach is same as the above, except a feeler gauge is inserted between the tool and the top and bottom of the right angle. If the feeler gauge doesn't slip through a crack between the right angle and the tool, then the tool is considered to be perpendicular to the table or support, at least within the thickness of the feeler gauge.

Still another approach is to run a dial indicator micrometer up and down the tool vertically, to test for verticality. As in the prior methods, this one is time consuming and cumbersome.

Still another method involves a gyroscopic system which can be removably attached to a tool, such as a table saw blade, with magnets—something like an electro mechanical bubble level. This system first had to be calibrated to the table or support, then attached to the tool, and a reading taken. The apparatus required to practice this method was expensive and complex.

Therefore, it would be desirable to provide a simple, easy-to-read angle gauge and method of use to use when establishing perpendicularity between a tool and the table or platform supporting the work piece. In the broader application, it would be desirable to provide a simple, easy-to-read angle gauge to use when establishing perpendicularity (a 90 degree angle), or any other pre-determined angle, between any flat surface and a conductor.

SUMMARY OF THE INVENTION

Accordingly, it is an object of the present invention to provide an angle gauge which provides highly visible indication that a correct angle has been achieved. Design features allowing this object to be accomplished include a power supply and light connected in series between a pair of electrically conducting probes attached to a housing having a gauge angle. Advantages associated with the accomplishment of this object include being able to see that the correct angle has been achieved from a distance, along with the associated time and cost saving.

It is another object of the present invention to provide an angle gauge which is easily calibrated. Design features allowing this object to be accomplished include at least one probe having a probe thread sized to mate with a corresponding threaded bore in a housing. Benefits associated with the accomplishment of this object include increased accuracy, faster angle gauge calibration, and the associated savings in cost and labor.

It is still another object of this invention to provide an angle gauge which may be used to establish a correct angle in even non-conducting items. Design features enabling the accomplishment of this object include a conductor attached to an object whose angle is to be established, and a pair of electrically conductive probes attached to a housing probe wall on a housing, the housing probe wall and a housing foot defining a gauge angle. An advantage associated with the realization of this object is increased flexibility of use to establish pre-determined angles even in non-conducting items.

It is still another object of this invention to provide a method of use for an angle gauge which may be used to establish a correct angle in on object relative to a flat surface. Method steps enabling the accomplishment of this object include sliding the angle gauge across the flat surface until at least one probe is in electrical contact with the object, and then adjusting the angle between the object and the flat surface until both probes are in electrical contact with the object, thereby illuminating a light on the angle gauge to indicate the correct angle has been achieved. Advantages associated with the realization of this object include quickly and easily setting a correct angle between the object an the flat surface, and being able to see that the correct angle has been achieved from a distance, along with the associated time and cost saving.

It is still another object of the present invention to provide an angle gauge which accurately gauges the angle between a table saw blade and its table, even where the blade tips are wider than the rest of the blade. Design features allowing this object to be accomplished include probes extending away from a probe wall. Benefits associated with the accomplishment of this object include increased accuracy due to no interference between the wider blade tips and the probes.

It is yet another object of this invention to provide an angle gauge which is simple and inexpensive to manufacture. Design features allowing this object to be achieved include the use of components made of readily available materials, and off-the-shelf components. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIGS. 1 and 2. Sheet two contains FIGS. 3, 4 and 5. Sheet three contains FIGS. 6 and 7. Sheet four contains FIGS. 8 and 9.

DETAILED DESCRIPTION OF THE PREFERRED EMBODIMENT

Figure 1:
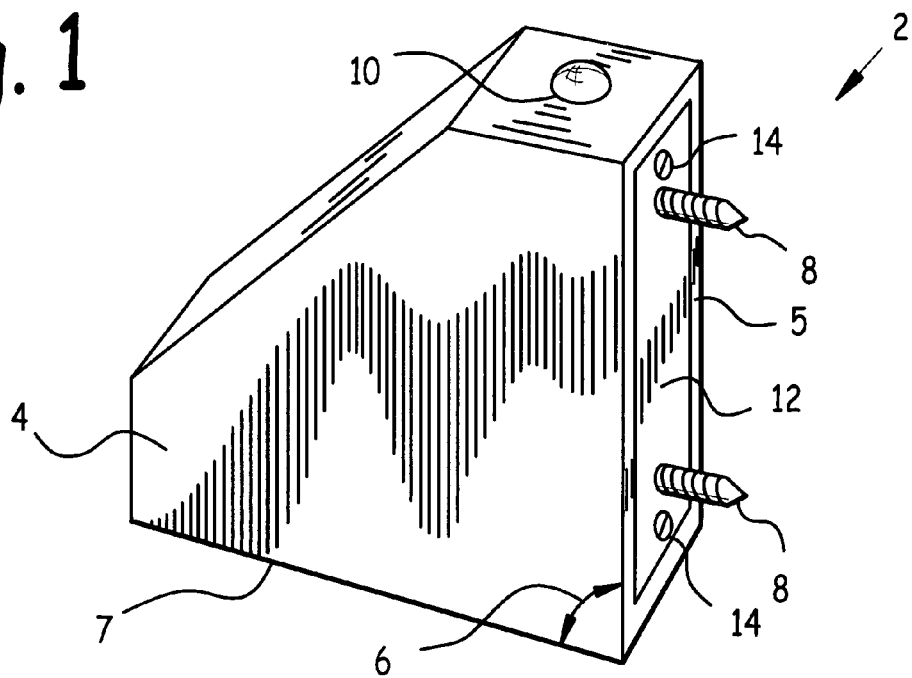
FIG. 1 is a front quarter elevated view of an angle gauge.
Figure 2:
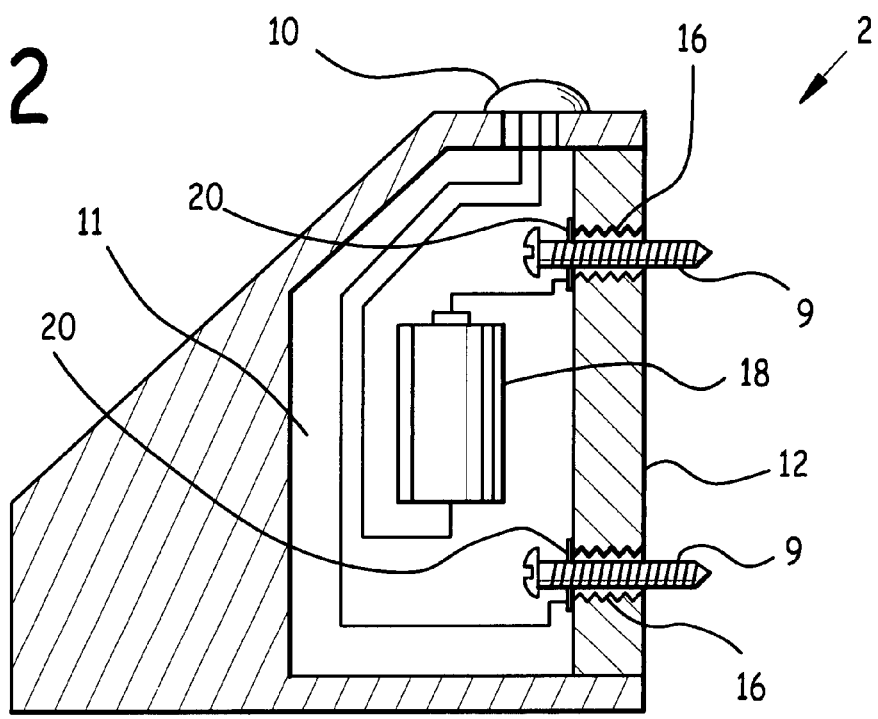
FIG. 2 is a side cross-sectional view of an angle gauge.
Figure 6:
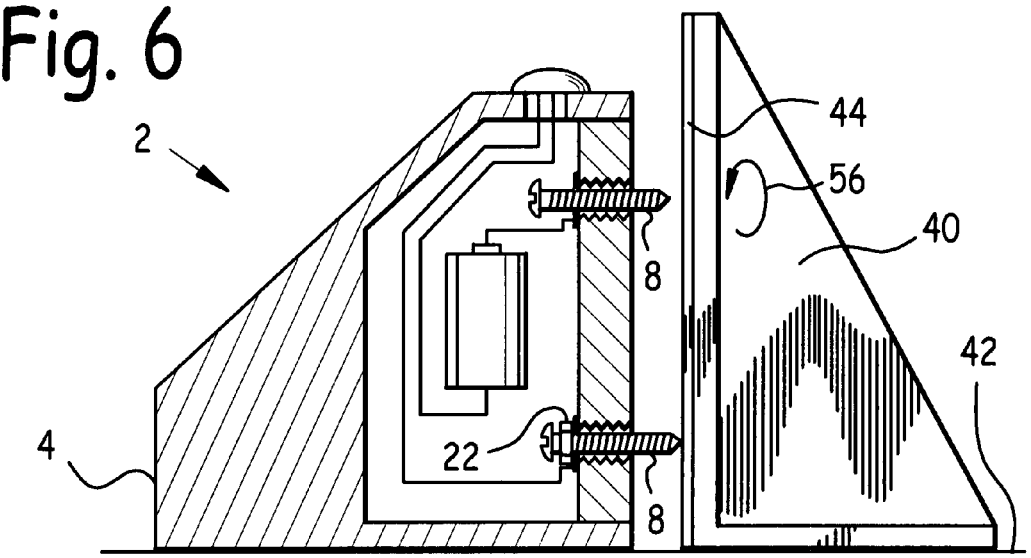
FIGS. 6 and 7 are side cross-sectional views of an angle gauge being calibrated using a calibrated angle.
Figure 7:
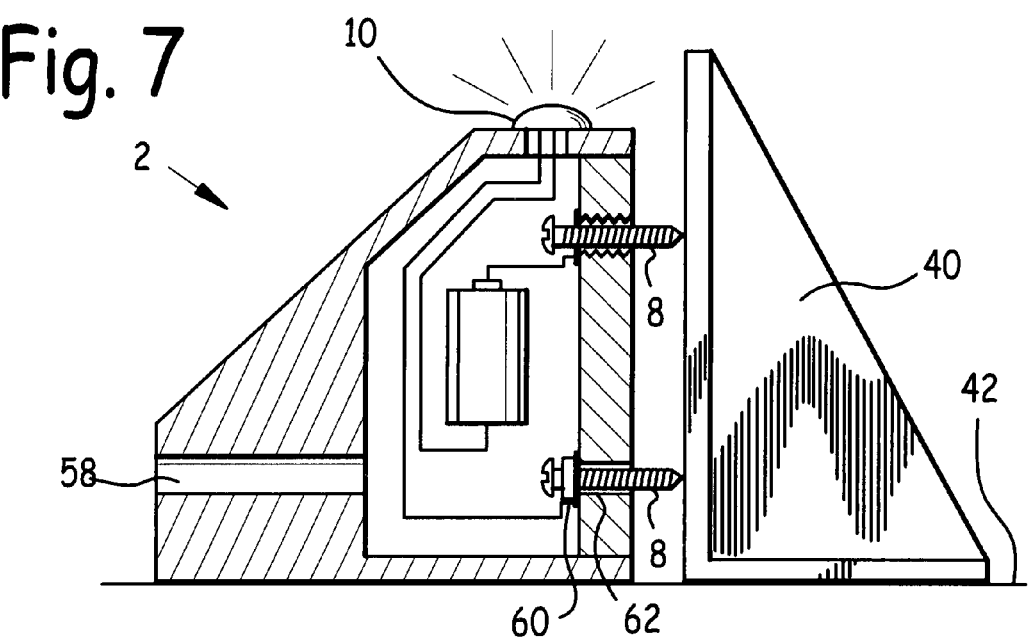

Referring now to FIG. 1 we observe a front quarter elevated view of angle gauge 2. FIG. 2 is a side cross-sectional view of angle gauge 2. Angle gauge 2 incorporates two electrically conductive probes 8, attached to housing 4. At least one probe 8 is adjustably attached to housing 4, so that angle gauge 2 can be calibrated as illustrated in FIGS. 6 and 7.

Housing 4 incorporates housing probe wall 5 and housing foot 7. In the preferred embodiment, housing probe wall 5 and housing foot 7 were flat surfaces. Angle gauge 6 is the angle between housing probe wall 5 and housing foot 7, and is substantially equal to the predetermined angle which angle gauge 2 is sized to gauge. In FIGS. 1-7 gauge angle 6 is 90 degrees.

Figure 4:
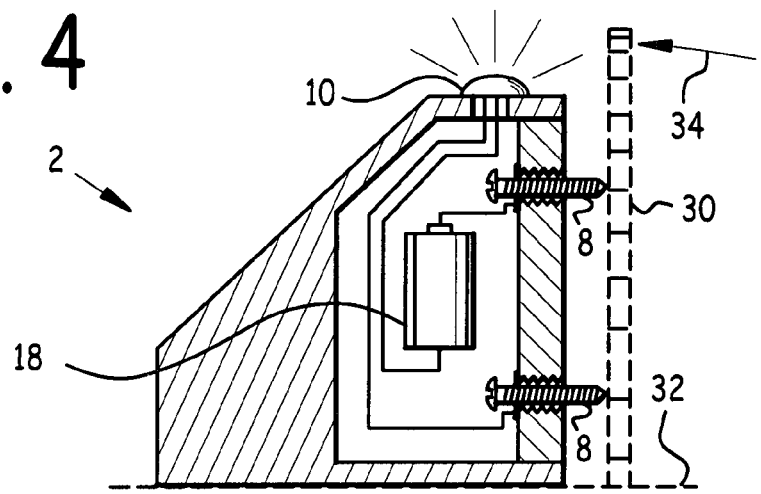
FIG. 4 is a side cross-sectional view of an angle gauge which has been used to set a saw blade at a 90 degree angle to its table, as evidenced by its illuminated light.

Light 10 and battery 18 are connected in series between electrically conductive probes 8. Thus, when probes 8 are electrically connected, light 10 illuminates as indicated in FIGS. 4 and 7.

As may be observed in FIG. 2, in the preferred embodiment at least one probe 8 is adjustably attached to housing 4. In the preferred embodiment this adjustability was obtained by providing probe thread 9 on probe 8, and mating housing threaded bore 16 in housing 4. One probe 8 may be immobilized by means of stop nut 22, as illustrated in FIG. 6.

In the preferred embodiment, housing 4 included probe plate 12, which was removably attached to housing 4 over housing recess 11, by means of probe plate fasteners 14. Housing recess 11 in housing 4 contained battery 18. Housing threaded bores 16 were located in probe plate 12.

Angle gauge 2 may comprise a probe contact plate 20 in electrical contact with each probe 8. In this configuration, light 10 and battery 18 are electrically connected in series between probe contact plates 20.

In use, angle gauge 2 is placed on the flat platform, support, or table to which an object is to be rendered perpendicular (or fixed at some other predetermined angle). If the object to be rendered perpendicular is not electrically conductive, a conductor 44 at least as long as the distance between probes 8 is adhered to it.

Figure 3:
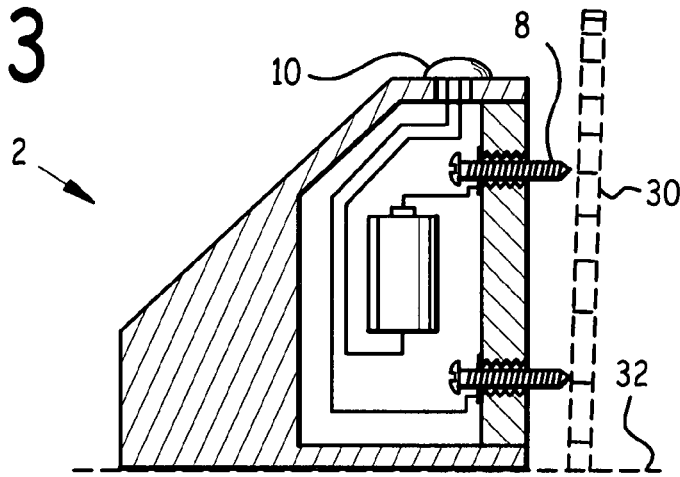
FIG. 3 is a side cross-sectional view of an angle gauge being used to set a saw blade at a 90 degree angle to its table.

Angle gauge 2 is then slid over the flat surface until at least one of its probes 8 touches the item to be set perpendicular to the flat surface, as depicted in FIG. 3. The object is then adjusted until both probes touch the object (or the conductor 44 adhered to it), at which point light 10 illuminates, thereby providing an easily observed indicator that the desired angle has been achieved. This is especially useful when the means for adjusting the angle of the object is located far away from the object being adjusted, such as is the case in many table saws, where the means of adjusting the table saw blade 30 angle is a little crank on the opposite side of the table saw from saw blade 30.

Figure 8:
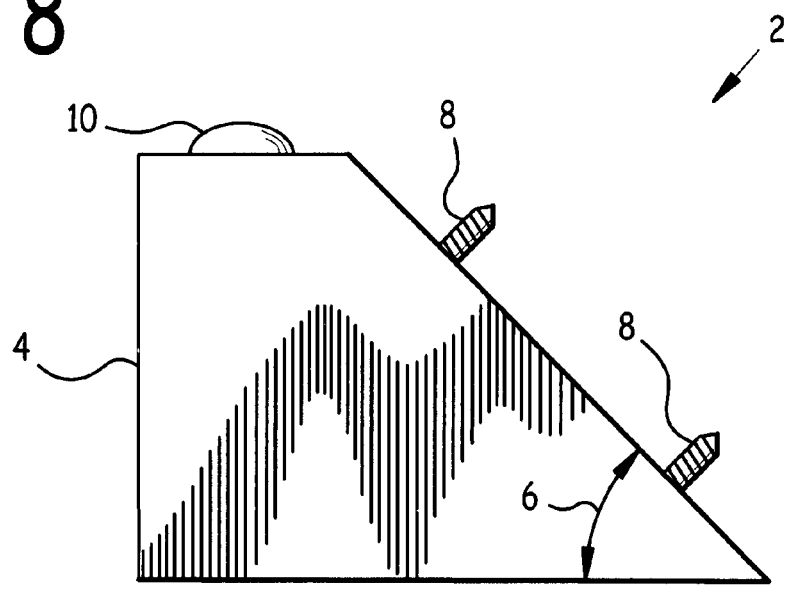
FIG. 8 is a side view of an alternate embodiment angle gauge having a 45 degree gauge angle.
Figure 9:
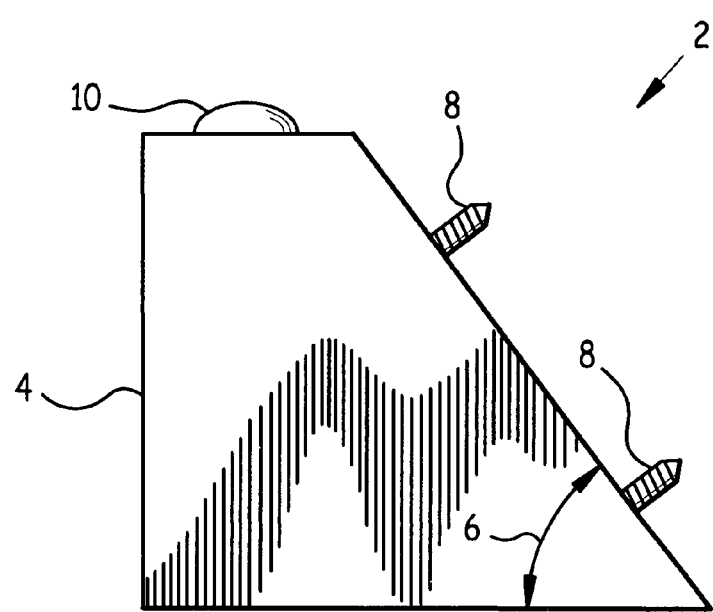
FIG. 9 is a side view of an alternate embodiment angle gauge having a 60 degree gauge angle.

In the previous description, the angle between the object whose angle is being gauged, and the reference flat surface, was 90 degrees, or perpendicular, corresponding to an angle gauge 2 having a gauge angle 6 of 90 degrees. It is intended to fall within the scope of this disclosure, however, that angle gauge 2 be constructed incorporating any desired gauge angle 6, and thus be used to gauge any angle for which such gauge angle 2 has been manufactured. For example, FIG. 8 depicts an angle gauge 2 having a gauge angle 6 of 45 degrees (and thus is intended to set an object at a 45 degree angle to its reference flat surface); FIG. 9 depicts an angle gauge 2 having a gauge angle 6 of 60 degrees (and thus is intended to set an object at a 60 degree angle to its reference flat surface).

To provide a specific example, FIGS. 3 and 4 are side cross-sectional views of angle gauge 2 being used to set a table saw blade 30 at a 90 degree angle to its table 32. In these figures, saw blade 30 is viewed on edge. In FIG. 3, saw blade 30 is tilted slightly to the right of 90 degrees, so although bottom probe 8 is in contact with saw blade 30, top probe 8 is not. In FIG. 4 saw blade 30 has been adjusted as indicated by arrow 34 until light 10 is seen to illuminate, signifying that saw blade 30 is now electrically in contact with both probes 8, and therefore perpendicular to table saw table 32. In this example, saw blade 30 is made of electrically conductive metal, so when both probes 8 touch saw blade 30, the open circuit between probes 8 is closed, which has the effect of closing the circuit between light 10 and battery 18, thus illuminating light 10.

Figure 5:
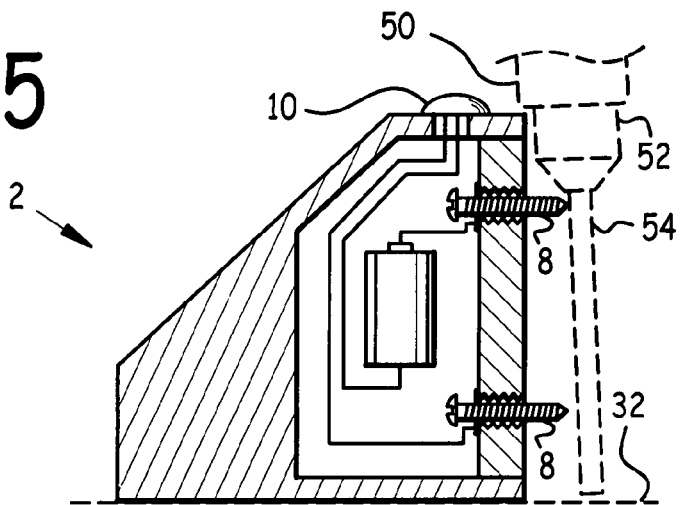
FIG. 5 is a side cross-sectional view of an angle gauge being used to set a drill press chuck at a 90 degree angle to its table.

To provide a further example, FIG. 5 is a side cross-sectional view of angle gauge 2 being used to set a drill press chuck 52 at a 90 degree angle to its table 32. Rod 54, a straight, constant-diameter, electrically-conductive rod, is securely fastened in chuck 52 of drill 50. In FIG. 5, rod 54 is tilted slightly to the left of 90 degrees, so although top probe 8 is in contact with rod 54, bottom probe 8 is not. The angle between rod 54 and table 32 is adjusted until light 10 is seen to illuminate, signifying that chuck 52 and rod 54 are now perpendicular to drill press table 32. In this example, rod 54 is made of electrically conductive metal, so when both probes 8 touch rod 54, the open circuit between probes 8 is closed, which has the effect of closing the circuit between light 10 and battery 18, thus illuminating light 10.

Angle gauge 2 may be calibrated to provide maximum precision. FIGS. 6 and 7 are side views of angle gauge 2 being calibrated using a calibrated angle 40. To calibrate angle gauge 2, both calibrated angle 40 and angle gauge 2 housing foot 7 are placed flat on flat surface 42. Then angle gauge 2 is slid over flat surface 42 until at least one of its probes 8 is in contact with calibrated angle 40. If calibrated angle 40 is not made of electrically conductive material, a conductor 44 at least as long as the distance between probes 8 may be adhered to its vertical surface.

In FIG. 6 we observe the bottom probe 8 extends farther than the top probe 8. Either probe 8 may be adjusted by turning relative to housing 4 as illustrated by arrow 56 in FIG. 6: turn probe 8 in one direction to extend it relative to housing 4; turn probe 8 in the opposite direction to retract it relative to housing 4. When probes 8 have been adjusted so that both probes 8 touch calibrated angle 40 as depicted in FIG. 7, light 10 illuminates. Angle gauge 2 is now calibrated. Although FIGS. 6 and 7 depict an angle gauge 2 having a gauge angle 6 of 90 degrees being calibrated, any desired gauge angle 6 can be calibrated by using a calibrated angle 40 having an angle corresponding to the gauge angle 6 desired.

FIG. 7 depicts an alternate embodiment angle gauge 2 having calibration bore 58 through housing 4. Calibration bore 58 communicates with an end of one probe 8 extending into housing 4, so that a tool such as a screw driver, Allan wrench, or nut driver inserted through calibration bore 58 may be used to turn the probe 8 with which calibration bore 58 communicates, thus facilitating calibration.

FIG. 7 also depicts an alternate embodiment gauge 2 having nut plate 60 (may be self-locking) attached to probe plate 12, and probe plate bore 62. Nut plate 60 is sized to mate with probe thread 9, and probe plate bore 62 is sized to slidably admit probe 8. In this embodiment, one or more probe(s) 8 may each be threaded through a corresponding nut plate 60, and extend through a corresponding probe plate bore 62. In this embodiment, a probe 8 which is threaded through nut plate 60 may be calibrated by rotating that probe 8 relative to its nut plate 60 as appropriate.

In the preferred embodiment, housing 4 and probe plate 12 were made of wood, synthetic, nylon, or any other appropriate material; probe plate 12 was preferably made of electrically non-conductive material. Light 10 and battery 18 were standard, off-the-shelf electrical components. Probes 8 were off-the-shelf electrically conductive fasteners, and their ends extending out of housing 4 were pointed. Stop nut 22 was an off-the-shelf fastener. Probe contact plates 20 were made of electrically conductive material such as metal. Electrical connections were made with standard electrical wire. Calibrated angle 40 and flat surface 42 were standard, commercially available calibration tools.

While a preferred embodiment of the invention has been illustrated herein, it is to be understood that changes and variations may be made by those skilled in the art without departing from the spirit of the appending claims.

| DRAWING ITEM INDEX |
| --- |
| 2 angle gauge |
| 4 housing |
| 5 housing probe wall |
| 6 gauge angle |
| 7 housing foot |
| 8 probe |
| 9 probe thread |
| 10 light |
| 11 housing recess |
| 12 probe plate |
| 14 probe plate fastener |
| 16 housing threaded bore |
| 18 battery |
| 20 probe contact plate |
| 22 stop nut |
| 30 saw blade |
| 32 table |
| 34 arrow |
| 40 calibrated angle |
| 42 flat surface |
| 44 conductor |
| 50 drill |
| 52 chuck |
| 54 rod |
| 56 arrow |
| 58 calibration bore |
| 60 nut plate |
| 62 probe plate bore |

I claim:

1. An angle gauge comprising a housing having a housing probe wall and a flat housing foot defining a gauge angle, two probes extending from said housing probe wall, and a light and a battery electrically connected in series between said probes.

2. The angle gauge of claim 1 further comprising means of adjusting at least one said probe relative to said housing.

3. The angle gauge of claim 2 wherein said adjusting means comprises a probe thread on said probe, and a threaded bore in said housing, said threaded bore mating with said probe thread.

4. The angle gauge of claim 3 further comprising a probe plate attached to said housing probe wall, and at least one said housing threaded bore in said probe plate.

5. The angle gauge of claim 4 further comprising a probe contact plate in electrical contact with each said probe, said light and said battery being electrically connected in series between said probe contact plates.

6. The angle gauge of claim 5 wherein said probe plate is removably attached to said housing by means of at least one probe plate fastener.

7. The angle gauge of claim 1 wherein said gauge angle is substantially 90 degrees.

8. The angle gauge of claim 1 wherein an end of each said probe extending away from said housing terminates in a point.

9. In combination, the angle gauge of claim 1 and an object whose angle relative to a flat surface is to be gauged, said housing foot being disposed flat on said flat surface, at least one said probe being in electrical contact with said object.

10. The angle gauge of claim 9 further comprising a conductor adhered to said object, whereby an angle of said object relative to a flat surface may be gauged, where said object is not electrically conductive.

11. The angle gauge of claim 9 wherein said object is a table saw blade and said flat surface is a table saw table.

12. The angle gauge of claim 9 wherein said object is a drill press chuck and said flat surface is a drill press table.

13. The angle gauge of claim 2 wherein said adjusting means comprises a probe thread on said probe, a nut plate mounted to said probe plate, a probe plate bore through said probe plate, said nut plate being sized to mate with said probe thread, said probe plate bore being sized to slidably admit said probe, whereby a length of said probe extending through said probe plate bore may be calibrated by rotating said probe relative to said nut plate.

14. The angle gauge of claim 2 further comprising a calibration bore extending through said housing, said calibration bore communicating with an end of one said probe inside said housing, whereby a tool inserted through said calibration bore may be used to turn said probe.

15. The angle gauge of claim 3 further comprising a calibration bore extending through said housing, said calibration bore communicating with an end of one said probe inside said housing, whereby a tool inserted through said calibration bore may be used to turn said probe.

16. A method of gauging an angle between an object and a flat surface comprising the steps of:
   A. Providing an angle gauge comprising a housing having a housing probe wall and a flat housing foot defining a gauge angle substantially corresponding to said angle, two electrically conductive probes extending from said housing probe wall, and a light and a battery electrically connected in series between said probes;
   B. Placing said angle gauge on said flat surface with said housing foot flat on said flat surface;
   C. Sliding said angle gauge over said flat surface until a least one said probes is in electrical contact with said object; and
   D. Adjusting an angle between said object and said flat surface until both said probes are in electrical contact with said object, thereby illuminating said light.

17. The method of gauging an angle between an object and a flat surface of claim 16 wherein said angle gauge further comprises means of adjusting a length of at least one said probe extending from said housing, said method comprising the further calibration steps of:
   E. Placing a calibrated angle on said flat surface, said calibrated angle having an angle corresponding to said gauge angle on said angle gauge;

F. Placing said angle gauge on said flat surface with said housing foot flat on said flat surface;

G. Sliding said angle gauge over said flat surface until at least one said probes is in electrical contact with said calibrated angle; and H. Adjusting a length of at least one said probe until both said probes are in electrical contact with said calibrated angle, thereby illuminating said light.

18. The method of gauging an angle between an object and a flat surface of claim 17 comprising the further step of adhering a conductor to said calibrated angle, said conductor being at least as long as a distance between said probes, whereby said conductor may electrically connect said probes, thereby illuminating said light, when said angle gauge is correctly calibrated.

19. The method of gauging an angle between an object and a flat surface of claim 16 comprising the further step of adhering a conductor to said object, said conductor being at least as long as a distance between said probes, whereby said conductor may electrically connect said probes, thereby illuminating said light, when said object is at said angle to said flat surface.

20. The method of gauging an angle between an object and a flat surface of claim 17 wherein said angle gauge further comprises a calibration bore extending through said housing, said calibration bore communicating with an end of one said probe inside said housing, and said method comprises the further steps of inserting a tool through said calibration bore and using said tool to turn said probe.

21. An angle gauge comprising a housing having a housing probe wall and a housing foot, said housing probe wall and said housing foot defining a gauge angle, two electrically conductive probes extending from said housing probe wall, means of adjusting a length of at least one said probe extending from said housing probe wall, and a light and a battery electrically connected in series between said probes.

22. The angle gauge of claim 21 further comprising a probe plate removably attached to said housing, said probes extending through said probe plate.

23. The angle gauge of claim 22 wherein said means of adjusting a length of at least one said probe comprises a probe thread on at least one said probe, and at least one corresponding mating housing threaded bore in said probe plate.

24. The angle gauge of claim 23 further comprising a housing recess in said housing, said battery being disposed within said housing recess, said probe plate covering said housing recess when said probe plate is installed on said housing.

25. The angle gauge of claim 24 wherein an end of each said probe extending away from said housing terminates in a point.

26. The angle gauge of claim 23 wherein at least one said probe is electrically connected to a corresponding probe contact plate, each said probe contact plate being attached to said probe plate, said light and said battery being electrically connected in series between said probe contact plates.

* * * * *